(12) United States Patent
Danielsen et al.

(10) Patent No.: US 8,453,221 B2
(45) Date of Patent: May 28, 2013

(54) METHOD FOR IMPROVING SECURITY IN LOGIN AND SINGLE SIGN-ON PROCEDURES

(75) Inventors: Stein H. Danielsen, Oslo (NO); Geirr I. Leistad, Sandvika (NO)

(73) Assignee: Microsoft International Holdings B.V., Amsterdam (NL)

( * ) Notice: Subject to any disclaimer, the term of this patent is extended or adjusted under 35 U.S.C. 154(b) by 641 days.

(21) Appl. No.: 12/338,939

(22) Filed: Dec. 18, 2008

(65) Prior Publication Data

US 2009/0165104 A1  Jun. 25, 2009

(30) Foreign Application Priority Data

Dec. 19, 2007 (NO) .................................... 20076550

(51) Int. Cl.
*H04L 29/06* (2006.01)

(52) U.S. Cl.
USPC ............ 726/6; 726/5; 726/7; 726/8; 713/155; 713/183

(58) Field of Classification Search
USPC .................. 709/227, 229; 713/155, 183, 200, 713/202; 726/5–8
See application file for complete search history.

(56) References Cited

U.S. PATENT DOCUMENTS

| 5,428,349 | A | 6/1995 | Baker | 340/5.54 |
|---|---|---|---|---|
| 6,209,102 | B1 | 3/2001 | Hoover | 726/18 |
| 6,571,336 | B1 | 5/2003 | Smith | 713/184 |
| 2002/0078386 | A1 | 6/2002 | Bones et al. | |
| 2005/0198534 | A1* | 9/2005 | Matta et al. | 713/201 |
| 2006/0005039 | A1* | 1/2006 | Hsieh | 713/183 |
| 2006/0053296 | A1* | 3/2006 | Busboom et al. | 713/182 |
| 2007/0011738 | A1 | 1/2007 | Doss | 726/18 |
| 2007/0083919 | A1 | 4/2007 | Heffez | |

FOREIGN PATENT DOCUMENTS

| GB | 2313460 | 11/1997 |
|---|---|---|
| WO | WO 2006/081593 | 8/2006 |

OTHER PUBLICATIONS

International Search Report mailed Mar. 19, 2009, in PCT/NO2008/000440, 4 pgs.

* cited by examiner

*Primary Examiner* — Brandon Hoffman
*Assistant Examiner* — Hee Song
(74) *Attorney, Agent, or Firm* — Merchant & Gould

(57) ABSTRACT

In a method for improving client's login and sign-on security in accessing services offered by service providers over shared network resources such as Internet and particularly working within the framework of the www, a password is created for the client at a first attempt to access the service provider. The client's password is generated either at an authentication authority in trust relationship with the service provider and transmitted to the client, or the client is allowed to create his or her password on the basis of random character sequences transmitted from the authentication authority. For subsequent access to the service provider the authentication authority presents a client for characters in ordered sequences or in a diagram containing in an appropriate order a single occurrence of each password character. The client performs a selection of the password for validation and transmits the validation back to the authentication authority, which verifies the password and informs the service provider of the verification. In a most preferred embodiment the password characters are never transmitted between the authentication authority and the client in a validation and verification procedure, and the former is wholly disconnected from either the client's credentials or any transactions subsequently to be undertaken between the service provider and the client.

20 Claims, 6 Drawing Sheets

| (1) | (2) | (3) | (4) | (5) |
|---|---|---|---|---|
| $a_1$ | $b_1$ | $c_1$ | $d_1$ | $e_1$ |
| $a_2$ | $b_2$ | $c_2$ | $d_2$ | $e_2$ |
| $a_3$ | $b_3$ | $c_3$ | $d_3$ | $e_3$ |
| $a_4$ | $b_4$ | $c_4$ | $d_4$ | $e_4$ |
| $a_5$ | $b_5$ | $c_5$ | $d_5$ | $e_5$ |
| $a_6$ | $b_6$ | $c_6$ | $d_6$ | $e_6$ |
| $a_7$ | $b_7$ | $c_7$ | $d_7$ | $e_7$ |
| $a_8$ | $b_8$ | $c_8$ | $d_8$ | $e_8$ |
| $a_9$ | $b_9$ | $c_9$ | $d_9$ | $e_9$ |
| $a_{10}$ | $b_{10}$ | $c_{10}$ | $d_{10}$ | $e_{10}$ |

Fig 4

| (1) | (2) | (3) | (4) | (5) |
|---|---|---|---|---|
|  |  | $c_1$ |  |  |
|  |  | $c_2$ |  |  |
|  |  | $c_3$ | $d_1$ |  |
| $a_1$ |  | $c_4$ | $d_2$ | $e_1$ |
| $a_2$ |  | $c_5$ | $d_3$ | $e_2$ |
| $a_3$ | $b_1$ | $c_6$ | $d_4$ | $e_3$ |
| $a_4$ | $b_2$ | $c_7$ | $d_5$ | $e_4$ |
| $a_5$ | $b_3$ | $c_8$ | $d_6$ | $e_5$ |
| $a_6$ | $b_4$ | $c_9$ | $d_7$ | $e_6$ |
| $a_7$ | $b_5$ | $c_{10}$ | $d_8$ | $e_7$ |
| $a_8$ | $b_6$ |  | $d_9$ | $e_8$ |
| $a_9$ | $b_7$ |  | $d_{10}$ | $e_9$ |
| $a_{10}$ | $b_8$ |  |  | $e_{10}$ |
|  | $b_9$ |  |  |  |
|  | $b_{10}$ |  |  |  |

Fig 5

|     (1) | (2)   | (3)   | (4)   | (5)   |
|---------|-------|-------|-------|-------|
| $a_1$    | $b_1$  | $c_1$  | $d_1$  | $e_1$  |
| $a_2$    | $b_2$  | $c_2$  | $d_2$  | $e_2$  |
| $a_3$    | $b_3$  | $c_3$  | $d_3$  | $e_3$  |
| $a_4$    | $b_4$  | $c_4$  | $d_4$  | $e_4$  |
| $a_5$    | $b_5$  | $c_5$  | $d_5$  | $e_5$  |
| $a_6$    | $b_6$  | $c_6$  | $d_6$  | $e_6$  |
| $a_7$    | $b_7$  | $c_7$  | $d_7$  | $e_7$  |
| $a_8$    | $b_8$  | $c_8$  | $d_8$  | $e_8$  |
| $a_9$    | $b_9$  | $c_9$  | $d_9$  | $e_9$  |
| $a_{10}$ | $b_{10}$ | $c_{10}$ | $d_{10}$ | $e_{10}$ |

Fig 6

| (1) | (2) | (3) | (4) | (5) |
|-----|-----|-----|-----|-----|
|     |     | $c_1$ |     |     |
|     |     | $c_2$ |     |     |
|     |     | $c_3$ | $d_1$ |     |
| $a_1$ |     | $c_4$ | $d_2$ | $e_1$ |
| $a_2$ |     | $c_5$ | $d_3$ | $e_2$ |
| $a_3$ | $b_1$ | $c_6$ | $d_4$ | $e_3$ |
| $a_4$ | $b_2$ | $c_7$ | $d_5$ | $e_4$ |
| $a_5$ | $b_3$ | $c_8$ | $d_6$ | $e_5$ |
| $a_6$ | $b_4$ | $c_9$ | $d_7$ | $e_6$ |
| $a_7$ | $b_5$ | $c_{10}$ | $d_8$ | $e_7$ |
| $a_8$ | $b_6$ |     | $d_9$ | $e_8$ |
| $a_9$ | $b_7$ |     | $d_{10}$ | $e_9$ |
| $a_{10}$ | $b_8$ |     |     | $e_{10}$ |
|     | $b_9$ |     |     |     |
|     | $b_{10}$ |     |     |     |

Fig 7

|     | (1) | (2) | (3) | (4) | (5) | (6) | (7) | (8) |
|-----|-----|-----|-----|-----|-----|-----|-----|-----|
|     | $a_1$ | $b_1$ | $c_1$ | $d_1$ | $e_1$ | $f_1$ | $g_1$ | $h_1$ |
|     | $a_2$ | $b_2$ | $c_2$ | $d_2$ | $e_2$ | $f_2$ | $g_2$ | $h_2$ |
|     | $a_3$ | $b_3$ | $\mathbf{c_3}$ | $d_3$ | $e_3$ | $f_3$ | $g_3$ | $h_3$ |
|     | $a_4$ | $b_4$ | $c_4$ | $d_4$ | $e_4$ | $f_4$ | $g_4$ | $h_4$ |
|     | $\mathbf{a_5}$ | $b_5$ | $c_5$ | $d_5$ | $e_5$ | $f_5$ | $\mathbf{g_5}$ | $h_5$ |
|     | $a_6$ | $b_6$ | $c_6$ | $d_6$ | $e_6$ | $\mathbf{f_6}$ | $g_6$ | $h_6$ |
|     | $a_7$ | $b_7$ | $c_7$ | $d_7$ | $e_7$ | $f_7$ | $g_7$ | $h_7$ |
|     | $a_8$ | $b_8$ | $c_8$ | $d_8$ | $\mathbf{e_8}$ | $f_8$ | $g_8$ | $h_8$ |
|     | $a_9$ | $b_9$ | $c_9$ | $d_9$ | $e_9$ | $f_9$ | $g_9$ | $h_9$ |
|     | $a_{10}$ | $b_{10}$ | $c_{10}$ | $d_{10}$ | $e_{10}$ | $f_{10}$ | $g_{10}$ | $h_{10}$ |

Fig 8

| (1) | (2) | (3) | (4) | (5) | (6) | (7) | (8) |
|-----|-----|-----|-----|-----|-----|-----|-----|
|     |     |     | $d_1$ |     |     |     |     |
|     |     |     | $d_2$ |     |     |     |     |
|     |     |     | $d_3$ |     | $f_1$ |     |     |
| $a_1$ | $b_1$ |     | $d_4$ |     | $f_2$ | $g_1$ |     |
| $a_2$ | $b_2$ |     | $d_5$ | $e_1$ | $f_3$ | $g_2$ | $h_1$ |
| $a_3$ | $b_3$ | $c_1$ | $d_6$ | $e_2$ | $f_4$ | $g_3$ | $h_2$ |
| $a_4$ | $b_4$ | $c_2$ | $d_7$ | $e_3$ | $f_5$ | $g_4$ | $h_3$ |
| $\mathbf{a_5}$ | $b_5$ | $\mathbf{c_3}$ | $\mathbf{d_8}$ | $e_4$ | $\mathbf{f_6}$ | $\mathbf{g_5}$ | $h_4$ |
| $a_6$ | $b_6$ | $c_4$ | $d_9$ | $e_5$ | $f_7$ | $g_6$ | $h_5$ |
| $a_7$ | $b_7$ | $c_5$ | $d_{10}$ | $e_6$ | $f_8$ | $g_7$ | $h_6$ |
| $a_8$ | $b_8$ | $d_6$ |     | $e_7$ | $f_9$ | $g_8$ | $h_7$ |
| $a_9$ | $b_9$ | $c_7$ |     | $e_8$ | $f_{10}$ | $g_9$ | $h_8$ |
| $a_{10}$ | $b_{10}$ | $c_8$ |     | $e_9$ |     | $g_{10}$ | $h_9$ |
|     |     | $c_9$ |     | $e_{10}$ |     |     | $h_{10}$ |
|     |     | $c_{10}$ |     |     |     |     |     |

Fig 9

METHOD FOR IMPROVING SECURITY IN LOGIN AND SINGLE SIGN-ON PROCEDURES

RELATED APPLICATIONS

This application claims priority under 35 U.S.C. 119, to application NO 20076550, filed Dec. 19, 2007, which is hereby incorporated in its entirety by reference.

BACKGROUND

To be able to build a so-called ecosystem around services offered on the World Wide Web (www) every participant in the ecosystem needs to be authenticated before accessing resources controlled by the service provider. This requires a single sign-on system.

There are numerous challenges to single sign-on scenarios. One of the hardest is the challenge of preventing fake input forms at malicious websites for usernames and passwords. A fake site with a fake login form can acquire the username and password of any user. A normal user or client would typically not hesitate to input his credentials if the input form looked visibly like the input form he or she uses at other sites.

BRIEF SUMMARY OF THE INVENTION

The present invention concerns a method for improving clients' login and sign-on security in accessing services offered by service providers on shared network resources such as Internet and particularly from service providers working within the framework of the world wide web wherein a client in order to gain access to the goods and services offered by the service provider initiates a creation of an account in the client's name at the service provider, wherein the client sends the service provider a chosen user name when receiving a message that an account has been created, wherein all communication in connection with transactions carried out between a client and a service provider takes place on shared network resources.

BRIEF DESCRIPTION OF DRAWINGS

The invention shall be better understood by reading the following discussion of exemplary embodiments in conjunction with the appended drawing figures of which

DETAILED DESCRIPTION OF THE INVENTION

Figure 1:
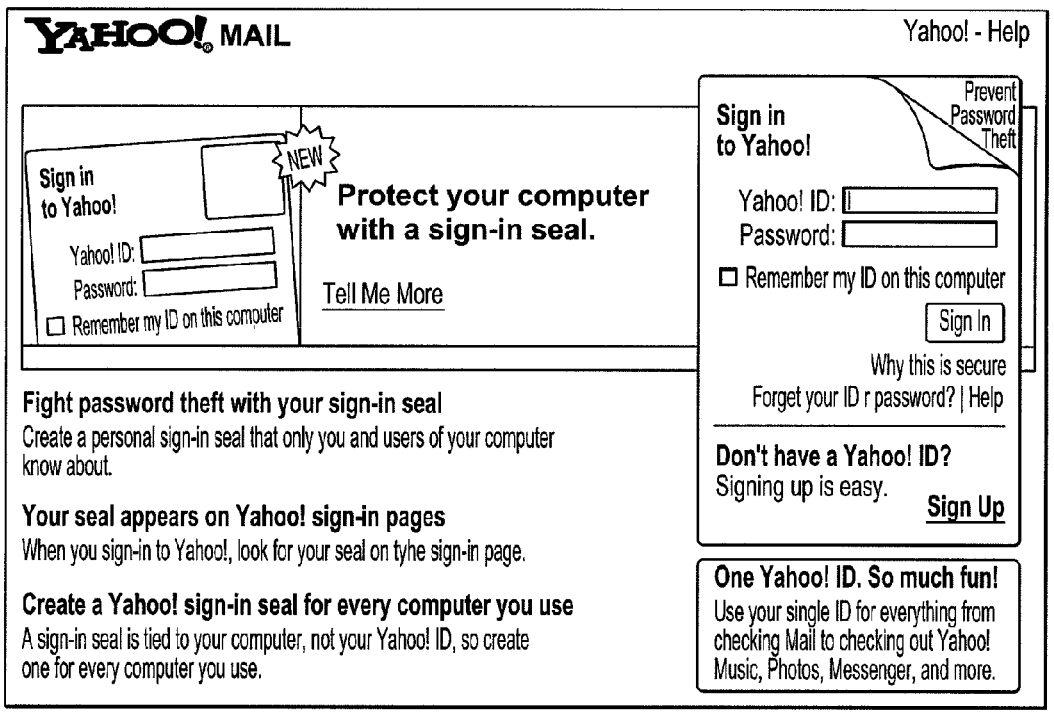
FIG. 1 shows a prior art login page, as mentioned above, FIG. 2 a phishing attempt relying on the genuine login page of FIG. 1 to obtain a client's user name and password for malicious purposes, as mentioned above, FIG. 3 ordered sequences or strings of characters with a selected password indicated, FIG. 4 a preferred presentation in the form of an array configuration of the strings in FIG. 3, FIG. 5 how the password is indicated by displacing mutually the columns of the array in FIG. 4 and aligning the password in one and the same row, FIG. 6 a preferred presentation similar to that of FIG. 4 for a client's own selection or creation of password, FIG. 7 how the password is created by displacing mutually the columns of the array in FIG. 6 and with the created password indicated, FIG. 8 an array similar to that in FIG. 4, but with dummy columns interspersed, FIG. 9 how the password is indicated with the array of FIG. 8, and with arbitrary displacements of dummy columns, FIGS. 10a and 10b how the entry and login pages may be presented to a client, and FIG. 11 how the login page can be integrated with a service provider's presentation or homepage.

A typical login page, as would be offered on a web service is shown in FIG. 1, which is the login page for Yahoo's mail.

Figure 2:
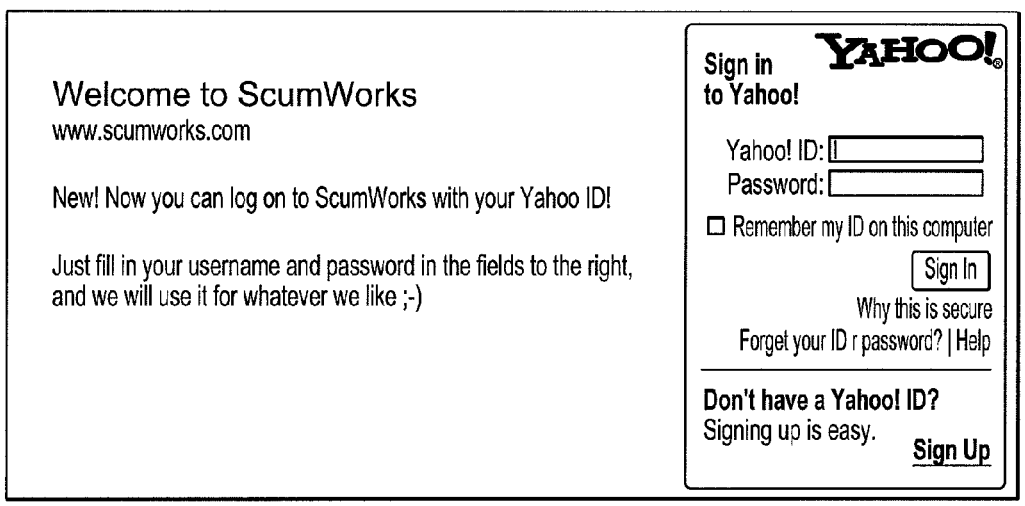

FIG. 2 shows a login page of phishing site on the web. A seemingly genuine approach may trick a non-reflecting user to give up user name and password to a malicious website.

Presently it is acknowledged that in order to provide a secure sign-on the site must be able to validate itself to the user, and the validation should be done in such a way that the user cannot skip or overlook that part. For instance a frequently used schema where the user needs to verify the URL (Uniform Resource Locator) and SSL (Secure Socket Layer) padlock icon will not suffice. Further in order to be generally usable by the web or client community, secure sign-on should rely on basic web technologies.

Present-day attempts or lack of attempts to provide solutions are briefly discussed below.

Microsoft Passport has no solution to this problem, and it has been one of the main reasons why Microsoft drew back its support for Passport login at $3^{rd}$ party sites. For this reason, currently only Microsoft or Microsoft partner companies use Passport.

Yahoo has just released what they call BBAuth (Browser-Based Authentication). BBAuth features "sign-on seal" which is a very simple mechanism for enabling the user to verify the login site. Typically, a user selects a color, and this color is displayed every time the user logs in. If the color is not displayed, the user must not enter his password, because that indicates that he is not connected to the correct server.

The Yahoo approach is insufficient in numerous ways. The most important point is that it is up to the user to do the authentication. Typically, users do not do this authentication. The sign-on seal could simply be replaced with blank space, or a message saying something like "the cookies on your computer are not accessible and therefore the sign-on seal is not visible".

Most users would not react to this, and would continue entering their usernames and passwords.

The Yahoo solution also gives the user a new sign-on seal for each computer the user uses. It can then be very confusing and not easy to remember which colors are good and which are not. Also, if cookies are lost, the sign-on seal is also lost, and it can be very hard to separate between a malicious site and just lost cookies.

Current web services offered on shared resource networks like Internet have seen a phenomenal growth in the later years and today have hundreds of millions of users worldwide. A comparable amount of transactions involving networking is likewise carried out every day in connection with the use of web services. Since a huge amount of these transactions is of a commercial nature or involves transfers of funds and buying and selling securities, valuables, goods and services, these web services have increasingly been made the victims of phishing, which is the attempt to criminally and fraudulently acquire sensitive information, particularly usernames, passwords and credit and banking card details as commonly used for securing and paying for transactions involving web services. Typically phishing entails masking as a trustworthy entity in an electronic communication situation and is typically carried out by email and instant messaging. As shown in FIG. 2, it often directs user to enter details at web sites. An improved password protection would thus be desirable and severely curtail phishing attacks on a user's banking and commercial activities involving web and networking services.

In view of the weaknesses and shortcomings of currently used login and sign-on procedures it is a main object of the present invention to provide a method for improving the security in single sign-on (SSO) procedures.

Another object of the present invention is to avoid an inadvertent disclosure of a client's password when the latter signs on to an account or web service via any shared network resource, e.g. Internet. The above objects as well as further features and advantages are realized with a method according to the invention which is characterized by steps for a) initiating a procedure for creating a unique password for the client in response to a creation of an account in the name thereof by transmitting a request from the service provider to an authentication authority, b) enabling creation of a unique password for the client and storing the created password at the authentication authority, c) generating upon the client's login to the account a number of strings of random characters, the number of strings being at least equal to the number of characters in the password and assigning each password character to a specific string, the strings being ordered following the sequence of characters in the password, d) transmitting the strings to the client and presenting the strings to the client in the manner that allows the latter to select each character of the password in a correct order from the respective strings, e) transmitting the client's selection of the characters constituting the password as a positional code or image to the authentication authority for validating the password, and f) verifying the client's password for the service provider thus enabling upon the verification of the password the client's sign-on to the account with a service provider.

In an advantageous embodiment of the method according to the present invention the password is created in step b) at the authentication authority, and the password is transmitted to the client via a secure electronic mail connection or as an SMS.

In another advantageous embodiment of the method according to the present invention the password is created in step b) at the client by transmitting an ordered sequence of strings of random characters such that no string contains the same character twice, and the client is allowed to select one character from each string to form a password of characters ordered in the same sequence as the strings, whereafter the client transmits the selected password to the authentication authority.

In yet another advantageous embodiment of the method according to the present invention one or more dummy strings are generated with same number of random characters as the strings comprising the password characters, such that the dummy strings contain no occurrence of a password character, said one or more dummy string(s) being interspersed as dummy columns in the array at arbitrary chosen positions, whereby said one or more dummy string(s) on aligning the columns comprising the password can be arbitrarily displaced relative to each and every other column of the array.

Further features and advantages shall be apparent from the additional appended dependent claims.

A particularly preferred embodiment of the method according to the invention shall now be described in more detail. This embodiment envisages that method is implemented on a system for user or client identification and authentication, and comprising the following three agents.

1. The authentication authority. The entity that is to perform the actual authentication process.
2. The end user or client. This is an individual that wants to identify himself or herself to a service provider.
3. The service provider. The service provider is the entity the client wants to identify himself or herselfto. This could be a website offering some benefit for users that have identified themselves, or where transactions between service provider and the client can be performed.

In order for the method to work properly the following relationships between the agents are recognized.

There is no trust relationship between the authentication authority and a service provider which has not entered into an agreement with the authentication authority.

There is a trust relationship between the authentication authority and a service provider which has entered into an agreement with the authentication authority.

There is no trust relationship between the client and the service provider.

The problem to be solved in order to provide a secure single sign-on method can then be formulated as follows. How can the client identify himself or herself to the initially untrusted service provider by using the authentication authority without exposing the authentication credentials (i.e. the password) to the untrusted service provider?

The solution to the problem is to make the creation of the login page dependent on already knowing the client credentials. The login page should be created in such a way that it is impossible for the client to expose his credentials if it is not created correctly. That way, a service provider that does not already know the credentials of the client cannot create the login page on which the client is able to expose his credentials.

Service providers that have entered into an agreement with the authentication authority have a trust relationship with this authority and can get the pre-created login page from the authentication authority and display it to the end user.

Service providers that have not entered into an agreement with the authentication authority and that have no trust relationship with the authentication authority cannot get a pre-created login page from the authentication authority.

Since the creation of the login page is dependent on already knowing the client credentials, service providers that do not have a trust relationship with the authentication authority cannot get hold of a pre-created login page.

Since an incorrectly generated login page makes it impossible for the client to enter his or her credentials, the credentials are not exposed to untrusted parties, and thus they stay protected.

The preferred embodiment will typically be performed in a web service ecosystem. Assuming a client wants to establish an account with a service provider the client will upon request enter at a user name and may create a client profile comprising various client credentials. The service provider then from a web server requests the authentication authority to generate a password for the client. The password is generated initially as a finite sequence of characters. Typically the characters is selected from a subset of characters defined in the standard or extended ASCII code and can thus be taken as alphabet upper and lower case letters, the integers 0-9 as well as a number of other graphic symbols.

The authentication authority would then store the created password in a protected server memory and send the password once to the client using a secure link for the transmission, for instance a secure email link or relaying the password via SMS (Short Message Service) to the client's mobile device supporting such a transmission. In any case the password shall not be known to the service provider.

When a client then subsequently accesses the web server of the service provider for login, the client will be requested to enter an already given username. Now instead of asking the client to enter his password, the service provider according to present invention requests the authentication authority to transmit the password to the client for verification.

In the following the above-stated particularly preferred embodiment shall be discussed with emphasis on its technical implementation.

Figures 3, 4, 5:
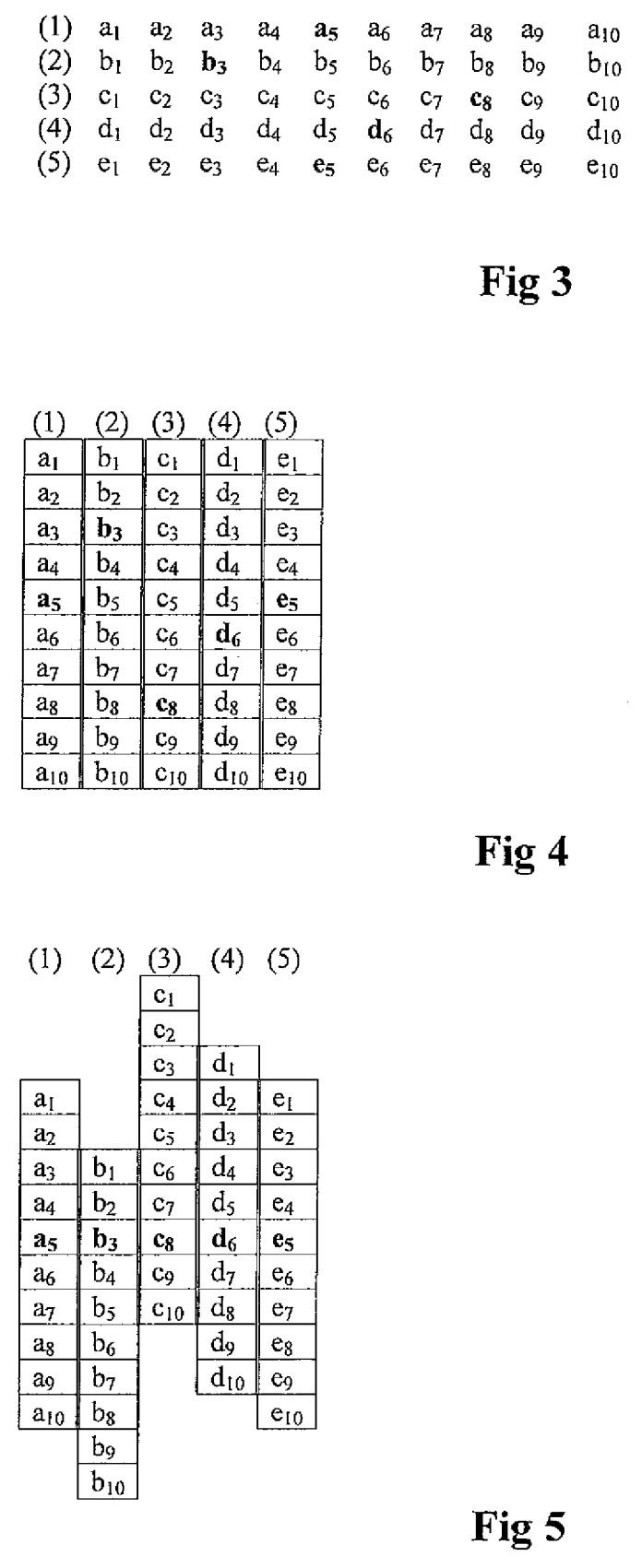

The transmission of the password is done as follows. The authentication authority having established a trust relationship with the service provider creates a number of sequences or strings of random characters chosen from the same code as used the for the creation of the password and with a number of strings being at least equal to the number of characters in the already created password, such that each string in a generated order contains one and only one character from the password. Typically each string of random characters could be created as a string of ten characters as shown in FIG. 3. The strings (1)-(5) are in the order given by the sequence of password 30 characters, which here are shown as $a_1$ to $a_{10}$ for the first string, $b_1$ to $b_{10}$ for the second string and so on. The created password is shown indicated in bold type. Each string comprises one and only one occurrence of a password character. The strings can now be presented in a login page submitted to the user from the authentication authority when the latter is requested by the web service to present the already generated password to the user. The client can then from the strings of random characters presented in the correct order select each character of his already received password by clicking on the symbol of the string in the correct order. Thus with the password example above the user must click on respectively $a_5$ in the first string, $b_3$ in the second string, $c_8$ in the third string, $d_6$ in the fourth string, and $e_5$ in the fifth string. It is of course to be understood that the characters a, b, c etc. as shown represent different characters chosen e.g. among a subset of characters in the ASCII code, with the understanding that no a, or b, or c, etc. is identical, i.e. all characters of a string are different.

The input of the password to authentication authority is not based on the keyboard with the exception of arrow keys, TAB and ENTER, but rather on the position of each character selected in the character strings as presented for the client.

In order to facilitate the client's password validation procedure, the character strings could be represented as an array diagram as shown in FIG. 4. Again the same random sequence of characters is used for each string as in FIG. 3 and the password example is the same. The login page presents this to the client on his or her computer screen or display device as an array of five columns and ten rows containing fifty randomly selected characters taken for instance from the ASCII code. Note that the only requirement is that each string shall be in the correct order and contain only one occurrence of each character of the password character sequence, but there is no requirement that different characters otherwise should be used for the different strings or columns of the array as shown in FIG. 4. For instance may a character that is used in the first position in the password also appear in random position in any of the other strings or columns (2)-(5) as shown in FIG. 4.

The client now clicks on the correct character in each string or alternatively displace each column vertically, forming the correct $a_5b_3c_8d_6e_5$ password aligned in one and the same row as shown in FIG. 5. A specific pattern or diagram is formed by the displaced strings or columns, or as they also could be called, sliders. This pattern is of course dependent upon the client selecting the correct password, and moreover the correct alignment of that password, here shown as characters $a_5b_3c_8d_6e_5$. The pattern created by the client completing the selection of characters of the password by a correct displacement of the sliders or columns is relayed back to the authentication authority as a positional code or simply as an image, which anyway would be the preferred mode of communicating the array as disclosed herein between the authentication authority and the client. Again, of course, no keyboard input is used in entering the password, as this simply is done by dragging the columns or sliders to align the correct password character on one and the same row.

As persons skilled in the aft will realize, it is assumed that the authentication authority who created the password initially shall know the password so the characters making up the sequence in each string shall include one occurrence of the correct password character of the string, while the remaining 9 characters are selected at random and the actual positioning of the password also chosen randomly. What is needed for the client to validate the password by a correct selection of the characters thereof and as presented, while the authentication authority performs the verification. The client cannot freely input any credentials, and thus the client's credentials will not be exposed in the communication taking place for validating and verifying a password.

For ensuring strict security this preferred embodiment always relies upon an authentication authority up to the creation of the masked password or presentation diagram in the login page, but password verification might also involve the service provider in a straightforward manner.

However, in order to optimize the security only the authentication authority's verification of the client's password is provided to service provider. This is advisable since the service provider in order to perform any required transaction must be in the possession of the client's credentials usually what is termed the client profile including details concerning payment methods, credit cards etc. as well as the username and mail addresses. No credentials of this kind is presented by the client to the authentication authority, which only is in possession of knowledge of the password and the verification of the password as selected by the client from the presentation form in the login page. No transmission of the client's credentials is involved in the password creation, validation and verification procedures. On the other hand the service provider need not necessarily know the client's password, only that this has been verified. Only the dialog between a service provider and a client can transfer to the transaction stage.

If it is required by the service provider to authenticate the client's password, no communication of the password from the service provider to any other party shall take place and in any case password acknowledgment by the client and the verification by any other party shall be completely decoupled from the client's credentials. The password characters as transmitted from say the authentication authority will be masked in the random symbol sequence making up each string in FIG. 3, or each column if it is sent in the form of a presentation diagram as illustrated in FIG. 4. The password being masked in this manner shall make it very hard to reveal by a phishing attempt.

In another, but perhaps less preferable embodiment of the present invention, the client is allowed to create his own password. As before, upon a first attempt to login or on an attempt of establishing an account with the service provider or a web service for the first time, the latter sends a command to the authentication authority in order to have the client's password created. Instead of now creating the password at the authentication authority, the authentication authority instead for instance selects an appropriate number of random characters taken from e.g. as before a subset of the ASCII code and transmit the strings of random characters to the client, preferably presented in the form of an array as shown in FIG. 6. The client is now allowed to select the password by choosing one character from each of the strings or columns (1)-(5) as presented. As with the validation of an already created password, the selection of a password can take place by an appropriate mutual displacement of the columns of the matrix in FIG. 7 to form for instance the password as the sequence $a_5b_3c_8d_6e_5$ as indicated by bold characters in FIG. 7. The diagram is transmitted from the client back to the authentication authority as a positional code or image with the provision that the position of at least one, preferably not more than one character of the password in a column must be indicated. The positional code is usually given with reference to the first column, but the position as indicated for one of the password characters could refer to a position in a specific column. For instance for column (3) the password characters will intrinsically be at position 8, but for instance at −4 if the position of the first character in the first column is taken as 0. Of course there is always an alternative to transmit the client-created password as the sequence of the selected characters via a secure link or as an SMS message to the authentication authority. This embodiment has the advantage that the client cannot freely choose the characters for the password, but is obliged to select the characters from each one of strings of random characters. Thus the inherent tendency of users and clients to select password with altogether easily recognizable mnemonic patterns is largely avoided.

In order to further increase the security in the password validation an arbitrary number of dummy strings could employed by the authentication authority, and these dummy strings could then be interspersed as additional columns in the array as shown in FIG. 4. An array with dummy columns would then appear as shown in FIG. 8, where three dummy columns have been added to the five columns containing the password characters. The characters of the dummy columns are chosen in the same manner as they are for the passwords shown in the above-mentioned figures. In the diagram of FIG. 8 columns (2), (4) and (8) are dummies, and preferably comprise no characters occurring in the password. When the client is presented with the array as shown in FIG. 8 for validating the given password as $a_5b_3c_8d_6e_5$, the alignment of the password characters is done in the same manner as discussed in connection with FIG. 5; the password-containing columns or sliders are displaced such that the password characters from each column appear aligned on one and the same row. The dummy columns can then be ignored as the client will not find any password character in these. Nevertheless the dummy columns can also be displaced arbitrarily, but preferably such that at least two or more rows of the array extend unbroken over all columns constituting the array. On returning the transformed pattern or image as shown in FIG. 9 with the correct password indicated to the authentication authority, the client's validation of the password is verified from the pattern as the authentication authority ignores the known dummy columns and reconstitutes the correct pattern from the columns (1), (3), (4) (6) and (7) containing the correct password characters as aligned by the client. Anyway the arrangement with dummy strings included to form the columns of the array shown in FIG. 9 shall enhance the security as it would be impossible to know the actual number of characters in the password and although an aligned row comprises the password characters, there are more characters on this aligned row than the actual number of characters in the password. In addition there will of course be other rows that are aligned, but the client performing the alignment of the columns by displacing or sliding the latter, shall not reveal the actual constitution of password. Verification at the authentication authority takes place on identifying the correct pattern of displaced columns and a verification statement issued to the service provider or web service.

If the seven-bit ASCII code is used, the authentication authority will have at its disposal a subset of about 9S characters to choose from, and without any repetitions there will be $95!/85!=3.7 \cdot 10^{19}$ possibilities for a random sequence of characters, ignoring the ASCII control code and performing the character selection without return. The allowable permutations can be calculated for the other columns keeping in mind to remove one pattern from the second column, two patterns from the third column and so on, as no two patterns shall repeat. Moreover, it is easily seen that for any chosen set of random patterns or characters in each column the array comprising five columns and ten randomly selected characters in each column offers $10^5$ possible configurations of the arrangement of characters and an equal number of possible patterns for creating an password character sequence.

It is also possible to envisage that the set of characters is substantially lower than the largest possible subset offered by the 7 bit or 8 bit ASCII code, but still the number of allowable permutations of characters will be astronomically high.

The same considerations also apply when the client is allowed to create the password as the chosen password then must be transmitted back to the authorization authority on a secure connection. It is worth noting that usually the diagrams, i.e. the matrices as shown in FIGS. 4, 6 and 8 in practice always will be transmitted as images and this, of course, also applies to these characters as selected. Also, when a client has selected the correct password for validation, the selected password can be transmitted back either as an image or a positional code, but the latter can easily be derived and generated automatically from the image.

Figure 10A:
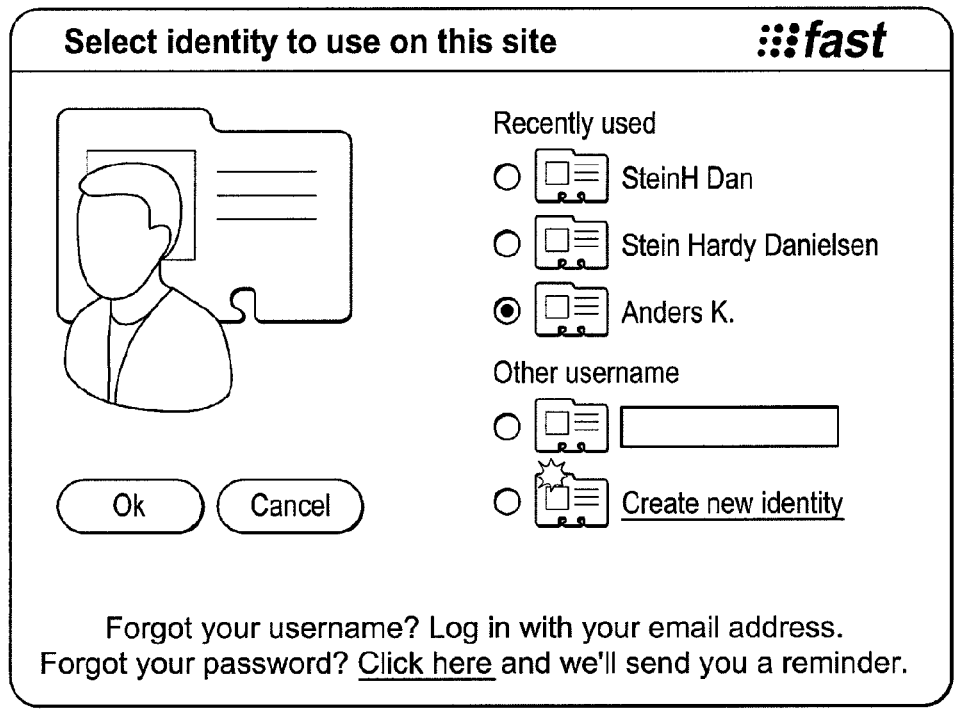
Figure 10B:
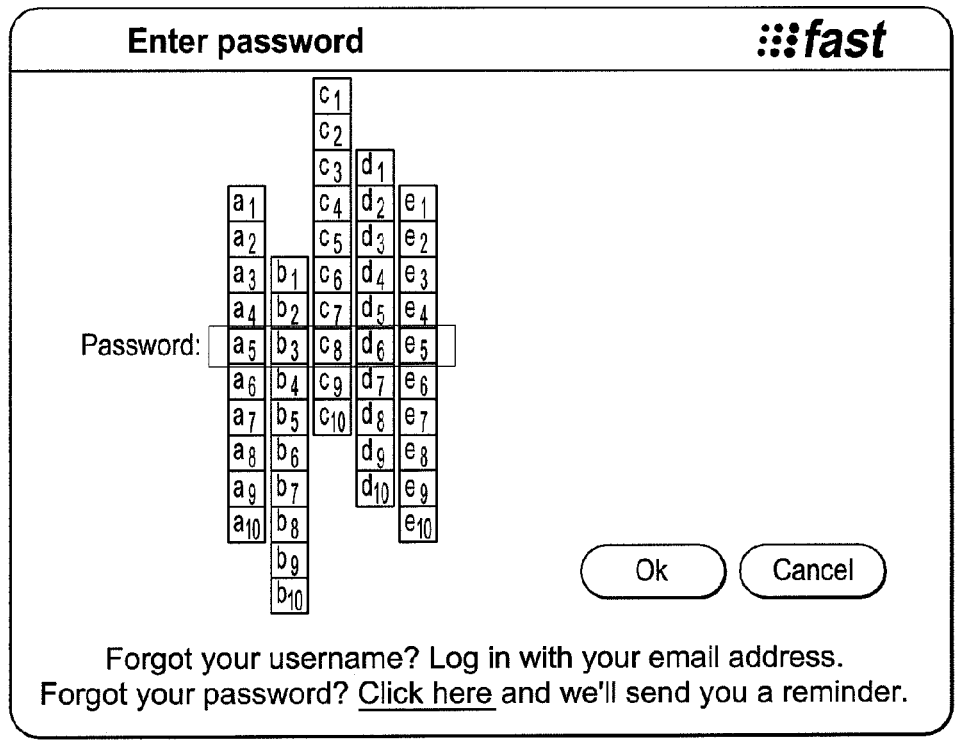

FIGS. 10*a* and 10*b* neatly sum up the actual login situation based on the method according to the present invention. The client already being registered as a user enters a username on accessing the service provider's web site as shown in FIG. 10*a*. Then the authentication authority is instructed from the service provider's web site to perform a verification of the client's password. To this end the authentication authority presents the login page shown in FIG. 10*b* but displays preferably the character strings embedding the password to the client as an image. The client validates the already given password by rearranging the columns by mutual sliding or displacing as shown in FIG. 10*b* and the validated password is transmitted back to the authentication authority, preferably in the form of a positional code or as an image. The authentication authority subsequently transmits the verification statement to the service provider or the web service. The latter, of course, will not know or see the actual password, nor shall the authentication authority ever be presented with the credentials of the client as entered in connection with the user name at the service provider or web service. When the authentication authority has informed the service provider or web service that the client password assigned to the username has been correctly validated, the transaction session between the web service and the client is inaugurated. Performing a single sign-on in the manner as disclosed by the most preferred embodiment of the present invention thus ensures that the client's credentials remain unknown to the authentication authority while the password remain unknown to service provider or the web service and moreover is never transmitted in connection with any transactions between the client and the service provider. As stated above the same will be the case for the session between the authentication authority and the client.

Figure 11:
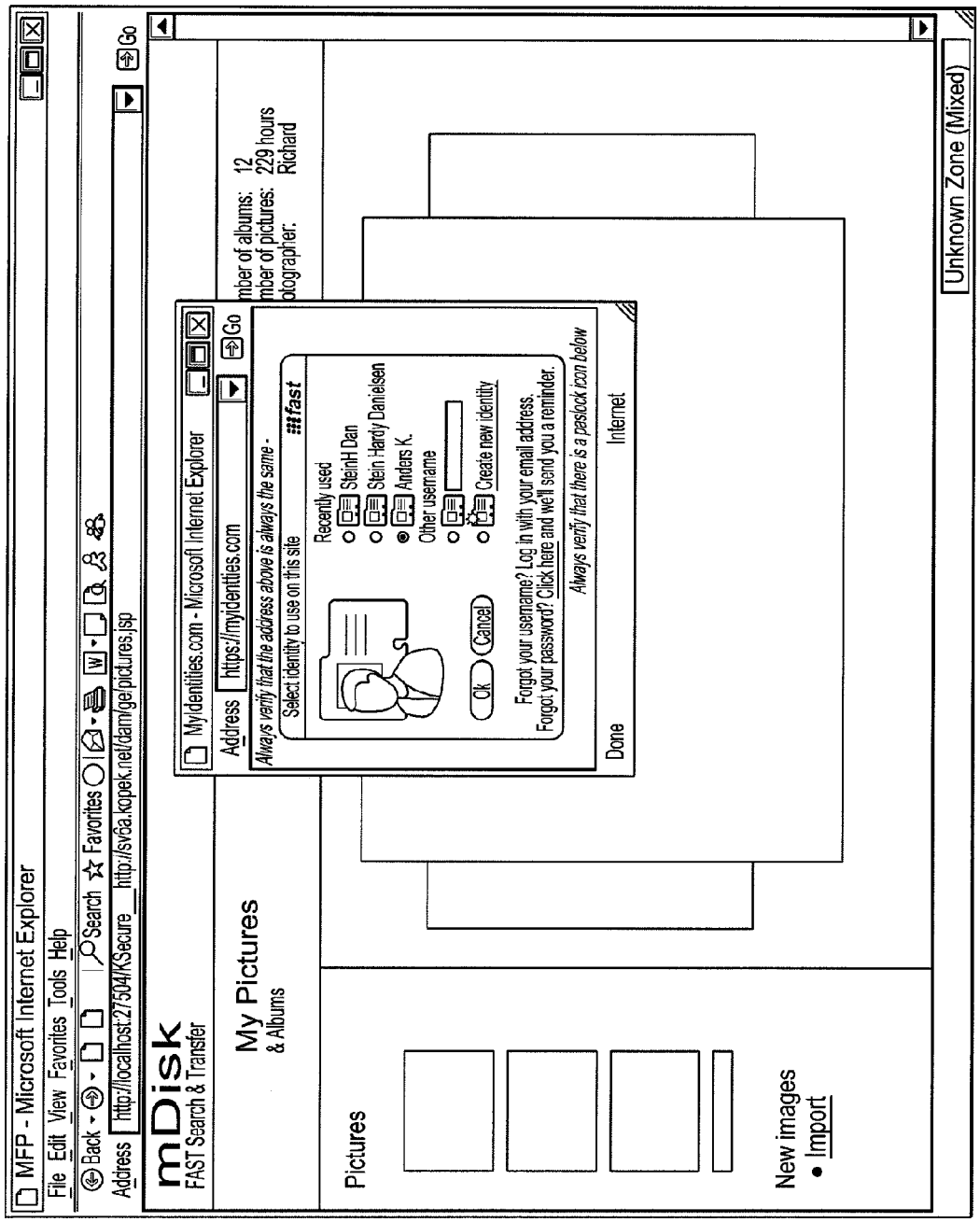

The method of the present invention scheme also allows for a better integration with partner sites, and allow for a more integrated approach to the branding of the site compared to the redirect approach of Microsoft and Yahoo (where the user is redirected away from the site and the whole browser goes to the login pages of Yahoo or Microsoft for authentication and then returns to the partner site). An example of an integrated login integration screenshot is shown in FIG. 11 using the mDisk service of the present assignee as an example.

It shall thus be understood that the authentication authority may well be integrated with a server provider or web service although the verification procedure then still is completely disconnected from the service offered as such from the service provider. The only necessary connection is the transmission of a request for verification and the subsequent message that verification has been undertaken and succeeded or failed. If, as stated above, a login attempt failed five times in a row, the authentication authority could default initiate the creation of a new password for a client, possibly also with the simultaneous relaying of this information to the service provider so that the client can be informed via the service provider or the web service, e.g. by using the home page or the presentation page thereof.

As disclosed hereinabove, it will be obvious to persons skilled in the art that different embodiments shall be possible within the scope and conceptual framework of the invention as disclosed by the appended claims. When the validation of the password takes place in the dedicated session between the user and the authentication authority which moreover is completely decoupled from any transaction session between the user and the service provider, no characters of the password is sent more than once, namely if a password is created initially by the authentication authority or the client, in which case it has to be transmitted respectively to the client or the authentication authority on a secure connection, which must be different from that used for validation session.

To prevent brute-force attacks, a new password is generated as mentioned above and sent by email or SMS to the client or authentication authority, depending on whose password was generated if there are 5 consecutive failed login attempts.

To avoid unauthorized eavesdroppers and subsequent replay attacks, the individual characters of the sliders are preferably always images as mentioned above, not the actual characters. Each image is assigned an identification code that is generated especially for the browser session and has no meaning for other sessions. On the authentication authority side, the session object holds the mapping of the image identifications and the actual character values. An attacker must then be able to perform OCR Optical Character Recognition) on the characters, but even so, his attempts to contact the server would fail, because his browser session would not have the same mapping of image identification and characters. Furthermore, in order to prevent over-the-shoulder attacks, the action of the client can be masked by blanking or hiding the password character and also the current string immediately after selection.

A person skilled in the art shall be able to implement the required verification and sign-on procedures according to the present invention by means of the HyperText Transfer Protocol (HTTP). Alternatively, the implementation of these procedures could take place by means of cookies and it should be well known that cookie programs in some client/server systems are run during user logon.

Further the verification and sign-on procedures as disclosed herein could be based on a scripting language such as JavaScript, which shall be included in a Web page to enable a required API (Application Programming Interface), but it would require a JavaScript compliant browser to run the JavaScript code. Finally, an open standard such as Secure Sockets Layer (SSL) could be used to establish a secure communication channel for the messaging required to set up and implement the method according to the present invention.

All the above-mentioned technologies for implementation are presently commonly used for client/server communications over the World Wide Web. Particularly has SSL been widely used to enable secure electronic financial transactions on the World Wide Web.

From the above it is seen that the method of the present invention shall allow for a marked improvement of prior art methods for single sign-on to service providers, web services and the like. Prominent features of the method of the present invention is inter alia that it is impossible for a client to enter the password if the authentication authority not already knows the password and that the selection of password, whether undertaken by the authentication authority or the client himself or herself, is based on random sequences of characters and thus ensures what would be termed very good password as they shall not be based on say mnemonic or other subjective preferences of the client. Furthermore the present invention is conceptually in a sense very similar to presently used procedures involving a username and a password and thus would be easy to adopt for clients familiar with the prior solutions. Also by resorting to transmitting the password as a diagram in the form of an image implies that the characters of the password never are transferred between the authentication authority or the client, although it might look like that for the latter.

The invention claimed is:

1. A method for authenticating a client, comprising:
   initiating a procedure for creating a password for the client in response to a creation of an account in the name thereof by transmitting a request from the service provider to an authentication authority,
   determining a password for the client and storing the created password at the authentication authority,
   generating at the authentication authority upon a login attempt by the client a number of strings of random characters, the number of strings being at least equal to the number of characters in the password and assigning each password character to a specific string, the strings being ordered following the sequence of characters in the password,
   receiving from the authentication authority the strings to the client and presenting each string of the strings in a different column to the client that allows the client to select each character of the password in a correct order from the respective strings,
   receiving selections aligning the password characters by displacing or sliding the columns relative to each other without changing an ordering of the characters of the string within its respective column; and
   verifying the client's password based on the selections aligning the password characters at the authentication authority for the service provider thus enabling upon the verification of the password a sign-on to the account of the client with a service provider.

2. The method of claim 1, wherein creating the password comprises creating the password at the authentication authority, and transmitting the password to the client via a secure electronic mail connection or as an SMS.

3. The method of claim 2, wherein creating the password comprises creating the password at the client by-transmitting from the authentication authority an ordered sequence of strings of random characters such that no string contains the same character twice, and receiving selections from the client that selects one character from each string to form a password of characters ordered in the same sequence as the strings, and receiving the selected password at the authentication client.

4. The method of claim 3, wherein receiving the password at the authentication authority comprises receiving the password via a secure electronic mail connection or as an SMS.

5. The method of claim 3, further comprising presenting the strings for the client as an m·n array such that each string forms a column of the array, and creating the password by receiving a selection of one character from each column such that password is formed with a number of characters equal to the number of columns.

6. The method of claim 5, wherein creating the password comprises sliding the columns or displacing the columns of the array mutually such that characters of the selected password is aligned on one and the same row in the resulting pattern of displaced columns, and receiving the thus created password at the authentication authority as a positional code or image comprising an indication of the position of at least one character of the password.

7. The method of claim 1, wherein presenting the strings, comprises presenting the strings as an m·n array, such that each string forms a column of the array, each string or column comprising one and only one occurrence of a character of the password, such that the columns in successive order contains the password symbols as given by this order in the password, and receiving this pattern at the authentication authority as a positional code or image.

8. The method of claim 1 further comprising generating one or more dummy strings with a same number of random characters as the strings comprising the password characters, such that the dummy strings contain no occurrence of a password character, and interspersing said one or more dummy string(s) as dummy columns in an array at arbitrary chosen positions, wherein the one or more dummy string(s) on aligning the columns comprising the password can be arbitrarily displaced relative to each and every other column of the array.

9. The method of claim 1, characterized by performing login and sign-on procedures further comprising using the service provider for relaying any communication between the client and authentication authority.

10. The method of claim 1, further comprising displaying the strings vertically.

11. A system for authenticating a client, comprising:
receiving from an authentication authority a number of strings, the number of strings being at least equal to the number of characters in a password used to authenticate the client, wherein each of the characters of the password are assigned to a specific string, the strings being ordered following the sequence of characters in the password;
displaying each of the strings in one of: a separate row and a separate column;
receiving a selection of each character of the password from at least a number of displayed strings as the number of characters in the password by changing a relative displayed position of one or more of the displayed strings with regard to the other displayed strings without changing an ordering of the characters in the string; and
transmitting the selected characters of the password to the authentication authority for authentication of the client.

12. The system of claim 11, wherein transmitting the selected characters of the password to the authentication authority comprises transmitting the selected characters of the password as an image to the authentication authority.

13. The system of claim 11, wherein receiving from the authentication authority the number of strings comprises receiving a dummy string having a same number of characters as the other strings but contains no occurrence of one of the characters in the password.

14. The system of claim 13, wherein displaying the strings comprises displaying the strings as an array of strings that includes the dummy string within the array or strings at an arbitrary chosen position.

15. The system of claim 11, wherein displaying the strings comprises displaying the strings such that a relative position of the display of the string is adjusted in response to receiving the selection of each character of the password.

16. The system of claim 11, wherein displaying the strings comprises the authentication authority presenting a login page for a service provider.

17. A computer-readable storage medium, excluding signals, that stores computer-executable instructions for authenticating a client, comprising:
receiving a number of strings being at least equal to the number of characters in a password used to authenticate the client, wherein each of the characters of the password are assigned to a specific string, the strings being ordered following the sequence of characters in the password;
displaying each of the strings in one of: a separate row and a separate column;
receiving a selection of each character of the password from at least a number of displayed strings as the number of characters in the password by changing a relative position of one or more of the displayed strings with regard to the other displayed strings without changing an ordering of the characters in the string; and
transmitting the selected characters of the password to the authentication authority for authentication of the client.

18. The computer-readable storage medium of claim 17, wherein transmitting the selected characters of the password to the authentication authority comprises transmitting the selected characters of the password as an image to the authentication authority.

19. The computer-readable storage medium of claim 17, wherein receiving from the authentication authority the number of strings comprises receiving a dummy string having a same number of characters as the other strings but contains no occurrence of one of the characters in the password.

20. The computer-readable storage medium of claim 19, wherein displaying the strings comprises displaying the strings as an array of strings that includes the dummy string within the array or strings at an arbitrary chosen position.

* * * * *